(No Model.) 2 Sheets—Sheet 2.
A. S. KROTZ.
SECONDARY OR STORAGE BATTERY.
No. 583,912. Patented June 8, 1897.
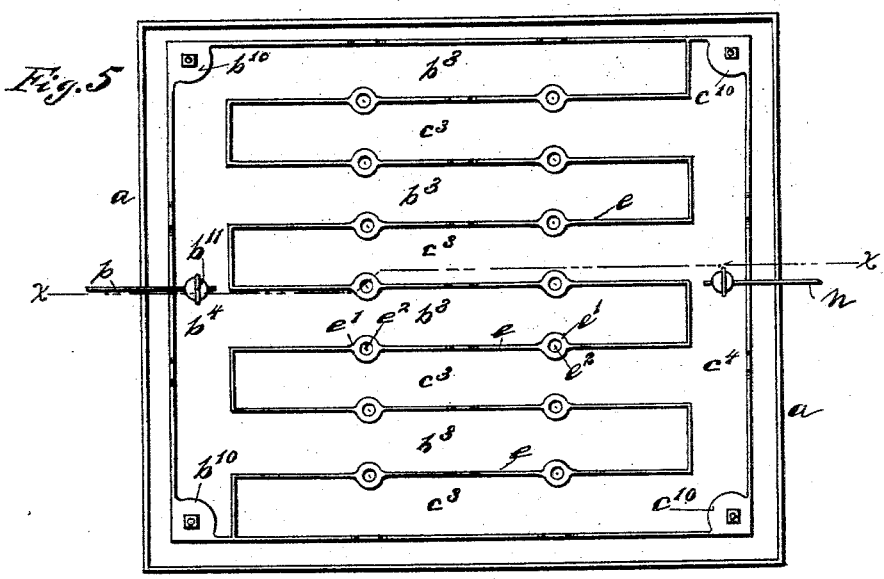
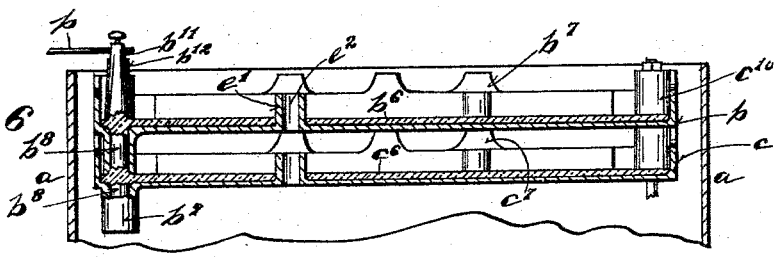
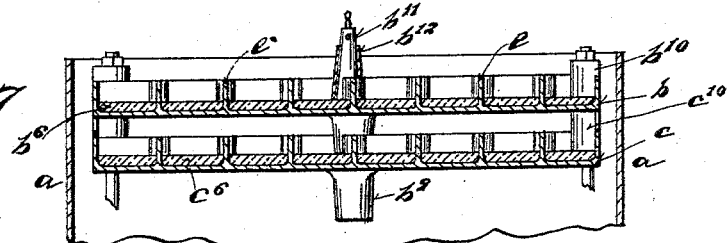
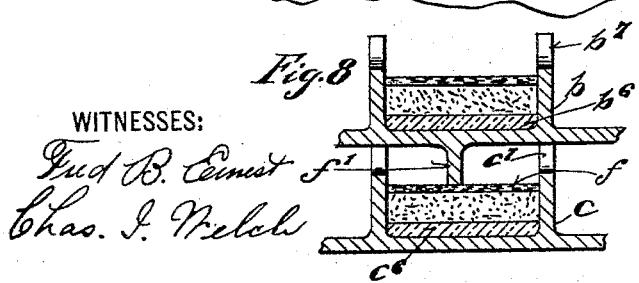
WITNESSES:
Fred B. Ernst
Chas. I. Welch
INVENTOR
Alvaro S. Krotz
BY
Staley & Shepherd
ATTORNEYS

UNITED STATES PATENT OFFICE.

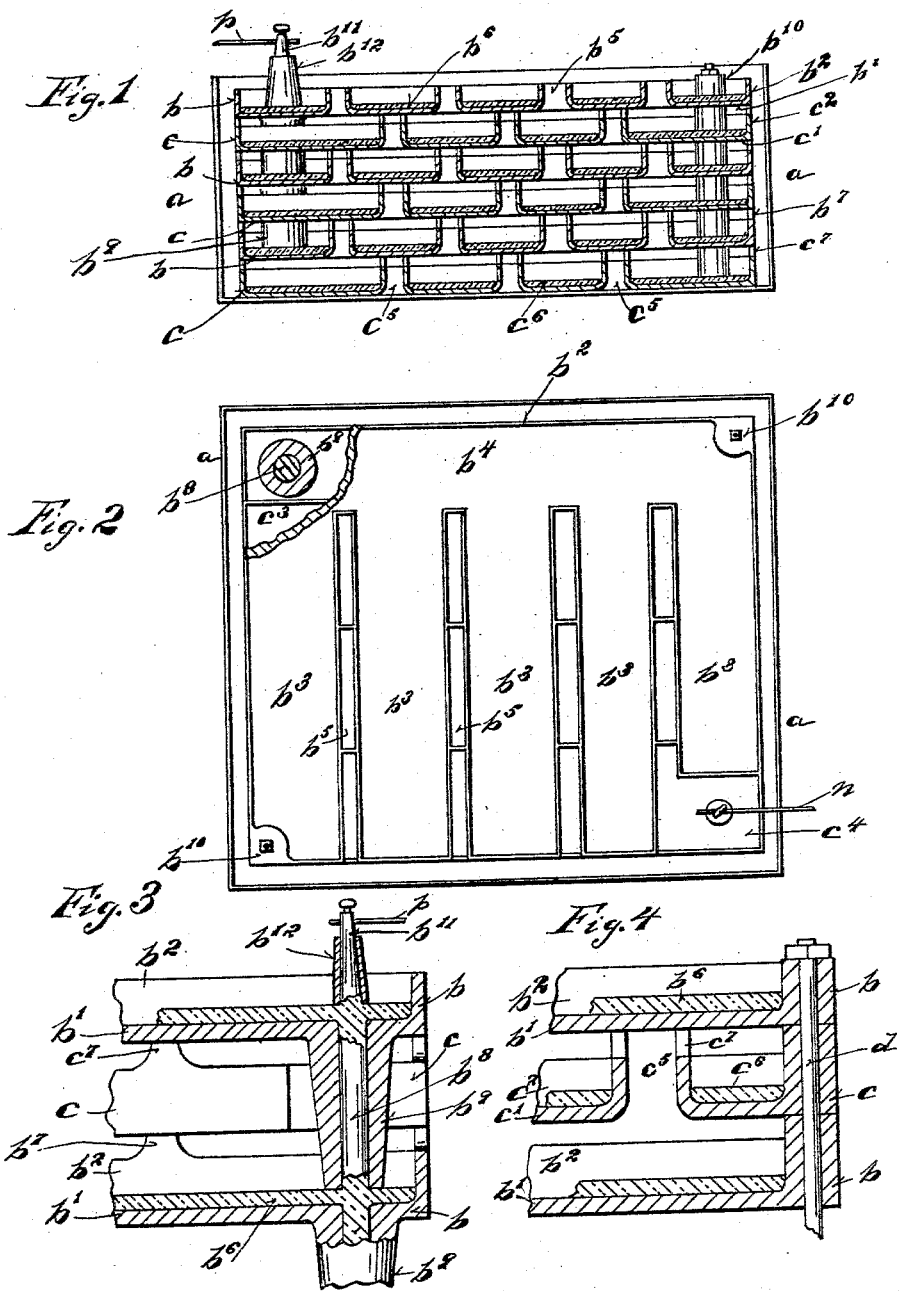

ALVARO S. KROTZ, OF SPRINGFIELD, OHIO, ASSIGNOR OF ONE-HALF TO O. S. KELLY, OF SAME PLACE.

SECONDARY OR STORAGE BATTERY.

SPECIFICATION forming part of Letters Patent No. 583,912, dated June 8, 1897.

Application filed March 27, 1894. Serial No. 505,241. (No model.)

*To all whom it may concern:*

Be it known that I, ALVARO S. KROTZ, a citizen of the United States, residing at Springfield, in the county of Clark and State of Ohio, have invented certain new and useful Improvements in Secondary or Storage Batteries, of which the following is a specification.

My invention relates to improvements in secondary or storage batteries; and the object of my invention is to so construct a secondary battery as to reduce the internal resistance to a minimum.

A further object of my invention is to construct a secondary battery in such a manner as to effectually prevent the displacement of the active material by the mechanical and chemical changes which take place in charging and discharging, and thus prevent the same from being short-circuited by the accumulation of said active material at the bottom of the retaining-cell.

A further object of my invention is to so construct the elements of a secondary battery that they will properly retain a very light, spongy, active material.

A further object of my invention is to provide a secondary battery which shall be simple in construction, cheap to manufacture, and effectual in the performance of its functions.

I attain these objects by the construction set forth in the following specification, and illustrated in the drawings, in which—

Figure 1 is a sectional elevation illustrating a storage battery embodying my invention. Fig. 2 is a plan view of the same with some of the parts broken away. Figs. 3 and 4 are sectional elevations in detail. Fig. 5 is a plan view illustrating a modification. Figs. 6, 7, and 8 are sectional views of the same.

Like parts are represented by similar letters of reference in the several views.

In the said drawings, $a$ $a$ represent an outer casing or retaining-cell, which may be constructed of any suitable non-conducting material, preferably glass, in the usual way. Within this cell I arrange a series of elements $b$ and $c$, which are connected, respectively, to the positive and negative poles of any suitable electric generator. These elements are constructed in a novel and peculiar manner, and consist, essentially, of plates $b'$ $c'$, each of which is provided with upwardly-projecting flanges $b^2$ $c^2$, which extend entirely around the same and form sides therefor to retain the active material on said plates. These plates are further formed into series of troughs $b^3$ $c^3$, which extend outwardly from a main trough or body $b^4$ $c^4$ and alternate with a series of slots or openings $b^5$ $c^5$. These plates may be formed either of a suitable conducting material, such as lead, or of a non-conducting material with a suitable conductor laid in the bottom thereof. The latter construction is the preferable one, as the construction thereof may thereby be cheapened, as when constructed of non-conducting material the supporting-plates may be formed of glass, hard rubber, or other suitable and cheap material. When constructed of non-conducting material, a conducting-plate $b^6$ $c^6$ is laid on the bottom of each of the plates, the construction being such that the plate will extend into each of the troughs and cover the entire bottom thereof, means being provided by which the different elements of the same polarity may be connected together, as will more fully appear hereinafter.

Each of the plates, with the exception perhaps of the top plate, will preferably be further provided with upwardly-projecting lugs $b^7$ $c^7$, upon which the next succeeding plate of the series will rest and be supported.

The elements $b$ and $c$ so constructed will be arranged alternately one above the other, the construction and arrangement of the troughs being such that the spaces or slotted openings $b^5$ $c^5$ will stand adjacent to and between the respective troughs, which are arranged above and below said plate, the outer or side trough of each succeeding element being preferably constructed wider than the intermediate ones, as shown in Fig. 1, for this purpose to produce plates or elements of a uniform size. The construction, therefore, is such that an open space or slotted opening comes directly over each of the troughs with the exception of the top, and each of the troughs will extend in opposite directions, so as to overlap two of the troughs of material below the same.

In placing the elements together to form a battery the main or connecting portions $b^4$ $c^4$ are placed at opposite ends, so that the outer or free ends of each trough will stand above the main or connecting body of the next succeeding or preceding trough. The alternate troughs in a series are connected together by means of a suitable metallic connection $b^8$ $c^8$. This is preferably accomplished by forming the side trough of each plate slightly shorter than the remaining troughs to make room for a downwardly-projecting sleeve or hollow leg $b^9$ $c^9$, formed on the bottom of each of said plates, and through which the conductors $b^8$ $c^8$ are adapted to extend and connect with the conducting-plates $b^6$ $c^6$ in the next corresponding element of the series. Each plate is further provided at opposite diagonal corners with lugs or projections $b^{10}$ $c^{10}$, which extend upwardly, with their tops in line with the lugs $b^7$ $c^7$, so as to form additional supports for the plates which rest thereon. The lugs are perforated and adapted to receive retaining bolts or rods $d$, also preferably formed of insulating material and extending through the entire series of plates, so as to join all of the same firmly together.

In constructing the conductors for the supporting-plates I preferably take the trough-shaped plates formed of insulating substance and pour into the same molten lead, which is allowed to run at a uniform depth, so as to properly cover the bottoms of all of the troughs in the plate to a proper thickness. The bottom plate of each series, it will be understood, has no projecting legs or sleeves $b^9$ $c^9$. The first two plates in the series being thus constructed, the next plate is placed in position with the legs or sleeves $b^9$ $c^9$ resting on the conducting-plate just formed. The molten metal is poured in this plate in the same manner and runs through the sleeves or hollow legs $b^9$ $c^9$ and joins with the conducting-plate in the element below with which it connects.

In order to insure a more perfect connection between the conducting-plate and the active material, I preferably apply the active material, such as oxid of lead, to the conducting-plates within the troughs while the metal of said plates is still in a soft or molten condition. The lower portions of the active material thus unite with the plates and form a perfect connection between the conductor and the active material. When the whole is completed by bolting any number of plates one above the other in the manner described, a perfect connection is formed between all of the plates of the same polarity and with the active material within the same.

The upper plate of each series is provided with an upwardly-extending conducting-piece $b^{11}$, which is preferably covered with an insulating-sleeve $b^{12}$. This conducting-piece may be formed in a similar manner by pouring the molten metal through a suitable sleeve or thimble, and to these the conducting-wires $p$ and $n$, leading from any suitable source of electric supply, are connected.

It will be seen that the arrangement of the troughs as thus described brings the active material of the respective elements in close proximity to each other. The active material is positively retained within the troughs and cannot become displaced by any chemical or mechanical action which results from rapid discharge of the battery or from any other cause.

By having the plates formed of non-conducting material no disintegration can take place, and the conductors being all properly insulated no local action can result and the internal resistance of the battery is reduced to the minimum. Each of the elements will be arranged between elements of the opposite polarity. The sides of each trough being arranged substantially over the center of the next lower trough the discharge will be from the edges of each trough downwardly into the trough below, and from the middle of said trough upwardly to the edges of the next succeeding trough. In discharging, therefore, the active material in each trough will be divided substantially into three divisions, each of which will stand in approximately the same relation to the material of an element of opposite polarity, so that the discharge may be extremely rapid, as it is well known that the chemical action which results in giving up the electric energy takes place between the nearest parts of elements of opposite polarity.

In Figs. 5, 6, and 7 I have shown the constructions modified in which I arrange the different elements in the same horizontal plane, the respective supporting troughs or receptacles for the active material of the different elements being formed in a single plate and divided one from the other by means of partitions $e$, which project upwardly from the bottom of the plate and form divisions between the respective troughs $b^3$ $c^3$ and the main portions $b^4$ $c^4$ of the respective elements. These partitions are further preferably provided with enlarged bosses $e'$, having openings $e^2$ extending through the same to permit the free circulation of the gases which may escape from the elements. In this arrangement the discharge takes place between the elements which lie adjacent to each other in the same horizontal plane. The construction of the connecting devices may be the same as in the other arrangement described. When thus constructed, the electrolyte may be placed directly in the receptacles which contain the active material, so that each plate is a cell within itself. In this case the outer flanges or upturned edges of the plate and those about the opening through the plate are preferably made higher than the division-walls, so as to retain the electrolyte and permit the same to spread uniformly over the electrodes.

In Fig. 8 I have shown the tops of the active material protected by a porous layer $f$ of asbestos or any other similar porous substance, this cover being adapted to be supported in place by a projection $f'$, formed on the bottom of the plate immediately above the same. This construction is preferably used in batteries which are liable to be moved about in such a manner that the active material might fall out of the retaining-troughs, and by its use all danger of the displacement of the active material is prevented.

By constructing the plates or elements as above described the troughs are not only capable of retaining loose, spongy, active material, but the active material will be supported by them in such a manner as to prevent the displacement thereof, so that the danger of short-circuiting by the active material falling to the bottom of the receptacle is prevented.

A secondary battery thus constructed, it will be seen, is very simple and cheap to construct, while the arrangement of the parts is such that the internal resistance is reduced to the minimum and the operations extremely effective.

Having thus described my invention, I claim—

1. In a secondary battery, a series of supporting-plates formed of insulating material and having slotted openings with upturned edges, and electrodes formed of active material arranged between the said upturned edges and between the said slotted openings, said plates being arranged one above the other with the slotted openings in one plate in line with the electrodes of the adjacent plates, substantially as specified.

2. A secondary battery consisting of a series of positive and negative electrodes each consisting of non-conducting supporting-plates having receptacles and active material therein, the supporting-plates for the electrodes being each formed with a perforated lug or lugs and the electrodes of the same polarity joined together by extending a part of the metal forming said electrodes through said perforated lugs, substantially as specified.

In testimony whereof I have hereunto set my hand this 20th day of March, A. D. 1894.

ALVARO S. KROTZ.

Witnesses:
CHAS. I. WELCH,
JAMES P. GOODWIN.